(12) United States Patent
Chen et al.

(10) Patent No.: US 12,015,164 B2
(45) Date of Patent: Jun. 18, 2024

(54) BATTERY MODULE AND BATTERY PACK

(71) Applicant: CONTEMPORARY AMPEREX TECHNOLOGY CO., LIMITED, Ningde (CN)

(72) Inventors: Xingdi Chen, Ningde (CN); Yuepan Hou, Ningde (CN); Kaijie You, Ningde (CN); Linggang Zhou, Ningde (CN); Peng Wang, Ningde (CN); Yanan Peng, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 561 days.

(21) Appl. No.: 17/129,629

(22) Filed: Dec. 21, 2020

(65) Prior Publication Data

US 2021/0111458 A1    Apr. 15, 2021

Related U.S. Application Data

(63) Continuation of application No. PCT/CN2020/074570, filed on Feb. 9, 2020.

(30) Foreign Application Priority Data

Feb. 27, 2019   (CN) .......................... 201920244527.7

(51) Int. Cl.
*H01M 50/209*    (2021.01)
*H01M 50/514*    (2021.01)
(Continued)

(52) U.S. Cl.
CPC ....... *H01M 50/209* (2021.01); *H01M 50/514* (2021.01); *H01M 50/536* (2021.01); *H01M 50/538* (2021.01); *H01M 50/531* (2021.01)

(58) Field of Classification Search
CPC ............. H01M 50/209; H01M 50/538; H01M 50/514; H01M 50/531; H01M 50/536
(Continued)

(56) References Cited

U.S. PATENT DOCUMENTS

| 2017/0069940 A1* | 3/2017 | Goldstein | ........... H01M 50/545 |
| 2020/0028201 A1* | 1/2020 | Ahn | ................... H01M 50/209 |
| 2021/0083243 A1* | 3/2021 | Nakamoto | .......... H01M 50/209 |

* cited by examiner

*Primary Examiner* — Jonathan G Jelsma
*Assistant Examiner* — Omar M Kekia
(74) *Attorney, Agent, or Firm* — Kilpatrick Townsend & Stockton LLP

(57) ABSTRACT

This application relates to a battery module and a battery pack. The battery module includes a binding member and battery cell assemblies arranged along a horizontal direction, the battery cell assembly including an upper-layer battery cell and a lower-layer battery cell that are stacked along a vertical direction, the upper-layer battery cell and the lower-layer battery cell interconnected and forming a joint; and the binding member covering the joint, located between two adjacent battery cell assemblies, and fixed to the battery cell assemblies. The battery module includes a binding member and a plurality of battery cell assemblies, and the battery cell assembly includes upper-layer and a lower-layer battery cells stacked along a vertical direction. A joint is formed between the upper-layer and lower-layer battery cells and covered by the joint fixed to the battery cell assemblies, swelling of the upper-layer and lower-layer battery cells at the joint is reduced.

20 Claims, 8 Drawing Sheets

(51) Int. Cl.
*H01M 50/536* (2021.01)
*H01M 50/538* (2021.01)
*H01M 50/531* (2021.01)

(58) Field of Classification Search
USPC .......................................................... 429/163
See application file for complete search history.

BATTERY MODULE AND BATTERY PACK

CROSS REFERENCE TO RELATED APPLICATIONS

This application is a continuation application of PCT Patent Application No. PCT/CN2020/074570, entitled "BATTERY MODULE AND BATTERY PACK" filed on Feb. 9, 2020, which claims priority to Chinese Patent Application No. 201920244527.7, filed with the State Intellectual Property Office of the People's Republic of China on Feb. 27, 2019, and entitled "BATTERY MODULE AND BATTERY PACK", all of which are incorporated herein by reference in their entirety.

TECHNICAL FIELD

This application relates to the field of energy storage elements, and in particular, to a battery module, a battery pack and an electric apparatus.

BACKGROUND

A battery module generally includes a plurality of battery cells. Each battery cell includes an electrode assembly and a housing. The electrode assembly is accommodated in the housing. In a charging/discharging process, the battery cell swells and protrudes externally. In addition, some gas is generated in the housing during charging/discharging, and the gas also causes the battery cell to swell.

Therefore, the battery module needs to be improved to overcome the foregoing technical problem.

SUMMARY

This application provides a battery module and a battery pack, so as to resolve a technical problem and reduce swelling of a battery module.

A first aspect of this application provides a battery module, including a binding member and a plurality of battery cell assemblies that are arranged along a horizontal direction. The battery cell assembly includes an upper-layer battery cell and a lower-layer battery cell that are stacked along a vertical direction;

the upper-layer battery cell and the lower-layer battery cell are interconnected and form a joint; and the binding member covers the joint, the binding member is located between two adjacent battery cell assemblies, and the binding member is fixed to the battery cell assemblies.

In some embodiments, each of the upper-layer battery cell and the lower-layer battery cell includes an electrode assembly and a battery housing, the electrode assembly is accommodated in the battery housing, and the electrode assembly includes a first electrode plate, a second electrode plate, and a separator disposed between the first electrode plate and the second electrode plate; and the electrode assembly is a winding structure in a flat shape, wherein an outer surface of the electrode assembly includes two flat surfaces, and the two flat surfaces face each other along the vertical direction; or the electrode assembly is a laminated structure, where the first electrode plate, the separator, and the second electrode plate are laminated along the vertical direction.

In some embodiments, the battery housing includes two first surfaces and two second surfaces, and an area of each first surface is greater than an area of each second surface; and the two second surfaces face each other along the horizontal direction, and the two first surfaces face each other along the vertical direction.

In some embodiments, one of the second surfaces of the upper-layer battery cell and a corresponding one of the second surfaces of the lower-layer battery cell are respectively bonded and fixed to one side of the binding member by using an adhesive.

In some embodiments, two sides of the binding member are respectively fixed to the two adjacent battery cell assemblies.

In some embodiments, the adhesive is a structural adhesive.

In some embodiments, the binding member completely covers one of the second surfaces of the upper-layer battery cell and a corresponding one of the second surfaces of the lower-layer battery cell.

In some embodiments, the binding member is a metal plate.

In some embodiments, the battery module further includes a pair of end plates, and the two end plates are respectively bonded and fixed to battery cell assemblies located at two ends of the horizontal direction.

A second aspect of this application further provides a battery pack, including a lower case and an upper cover, wherein the lower case and the upper cover are interconnected and form an accommodating cavity, the battery pack further includes the foregoing battery module, and the battery module is accommodated in the accommodating cavity.

A third aspect of this application further provides an electric apparatus, including the foregoing battery module.

In the battery module, battery pack and electric apparatus provided by this application, the battery module includes a binding member and a plurality of battery cell assemblies that are arranged along a horizontal direction, the battery cell assembly includes an upper-layer battery cell and a lower-layer battery cell that are stacked along a vertical direction, and the upper-layer battery cell and the lower-layer battery cell are interconnected and form a joint. Because the binding member is disposed to extend along the vertical direction and cover the joint and the binding member is fixed to the battery cell assemblies, swelling of the upper-layer battery cell and the lower-layer battery cell at the joint is limited and battery product quality is improved.

It should be understood that the foregoing general description and the following detailed description are merely examples, and are not intended to limit this application.

REFERENCE NUMERALS

1: battery module;
  11: battery cell;
    111: battery housing;
      111a: opening;
      111b: first surface;
      111c: second surface;
    112: electrode terminal;
    113: electrode assembly;
      113a: first electrode plate;
      113b: second electrode plate;
      113c: separator;
      113d: flat surface;
      113e: narrow surface;
    114: tab;
    115: connecting piece;
    116: cover;
    117: upper-layer battery cell;
    118: lower-layer battery cell;
    119: joint;
  11a: battery cell assembly;
  12: binding member;
  13: leading-out terminal;
  14: busbar;
  15: end plate;
  16: strap;
2: lower case;
3: upper cover; and
4: accommodating cavity.

The accompanying drawings herein are incorporated into the specification and constitute a part of the specification. The accompanying drawings show embodiments that conform to this application, and are used in combination with the specification to explain the principle of this application.

DESCRIPTION OF EMBODIMENTS

This application is hereinafter further described in detail with reference to specific embodiments and accompanying drawings.

In the description of this application, in all the accompanying drawings, a direction to which an arrow A points is a length direction, a direction to which an arrow B points is a width direction, and a direction to which an arrow C points is a vertical direction. A horizontal direction is a direction parallel to a horizontal plane, and may be either the length direction or the width direction. In addition, the horizontal direction not only includes a direction that is absolutely parallel to the horizontal plane, but also includes a direction that is approximately parallel to the horizontal plane, as normally cognized in engineering. The vertical direction is a direction vertical to the horizontal plane. The vertical direction not only includes a direction that is absolutely vertical to the horizontal plane, but also includes a direction that is approximately vertical to the horizontal plane, as normally cognized in engineering. In addition, directional terms such as "up", "down", "top", and "bottom" described in this application are all understood relative to the vertical direction.

Figure 1:
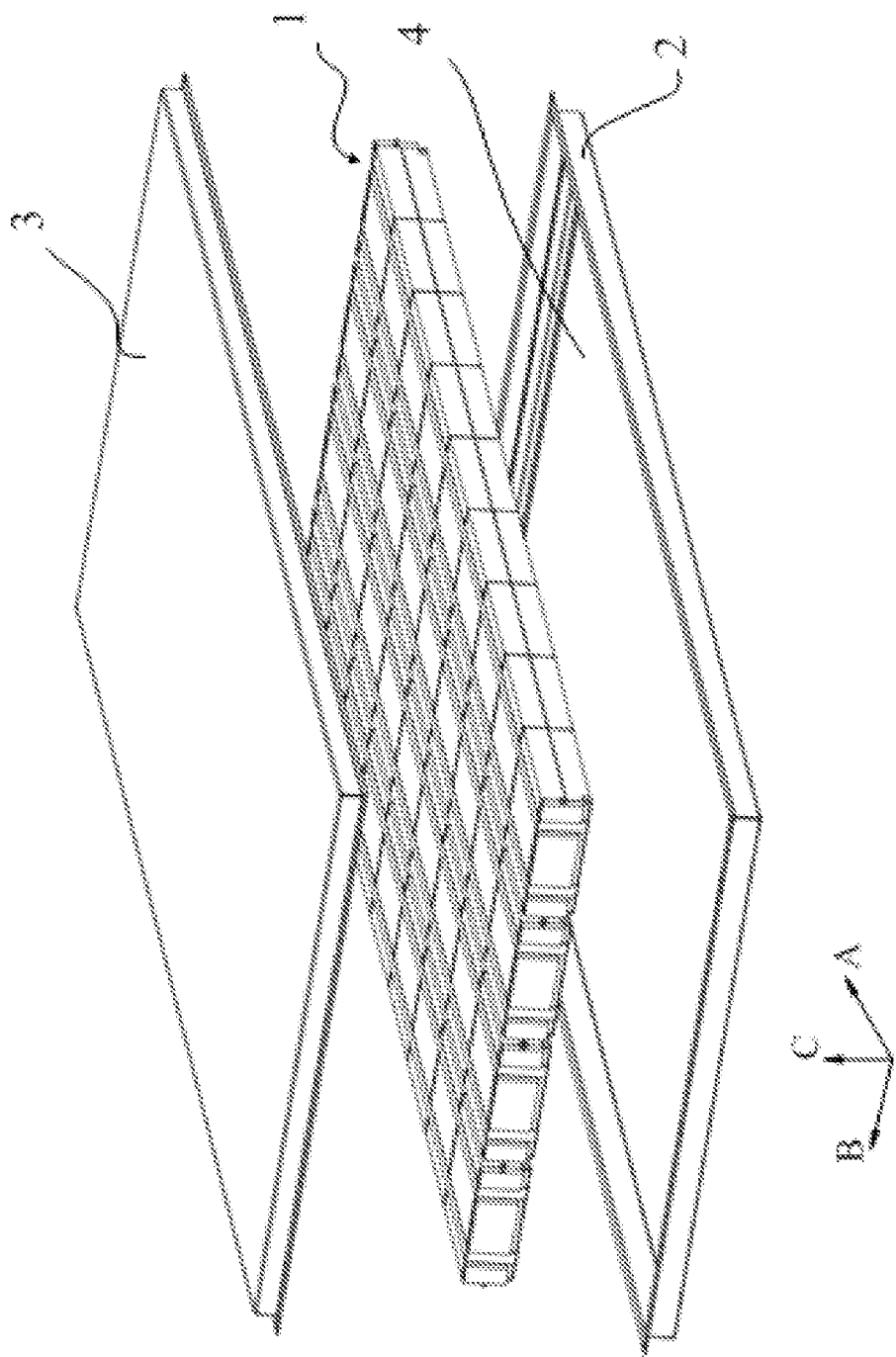
FIG. 1 is an exploded view of a structure of a battery pack according to an embodiment of this application.

As shown in FIG. 1, a battery pack provided by an embodiment of this application includes a battery module 1, a lower case 2, and an upper cover 3. The lower case 2 and the upper cover 3 are interconnected and form an accommodating cavity 4. A plurality of battery modules 1 are located in the accommodating cavity 4. The plurality of battery modules 1 may be disposed in parallel along a length direction of the battery pack. Alternatively, the plurality of battery modules 1 may be disposed in parallel along a width direction of the battery pack. The battery module 1 has a plurality of battery cells 11, and the plurality of battery cells 11 in the battery module 1 may be enclosed by a strap 16 (refer to FIG. 5 for the strap).

Figure 2:
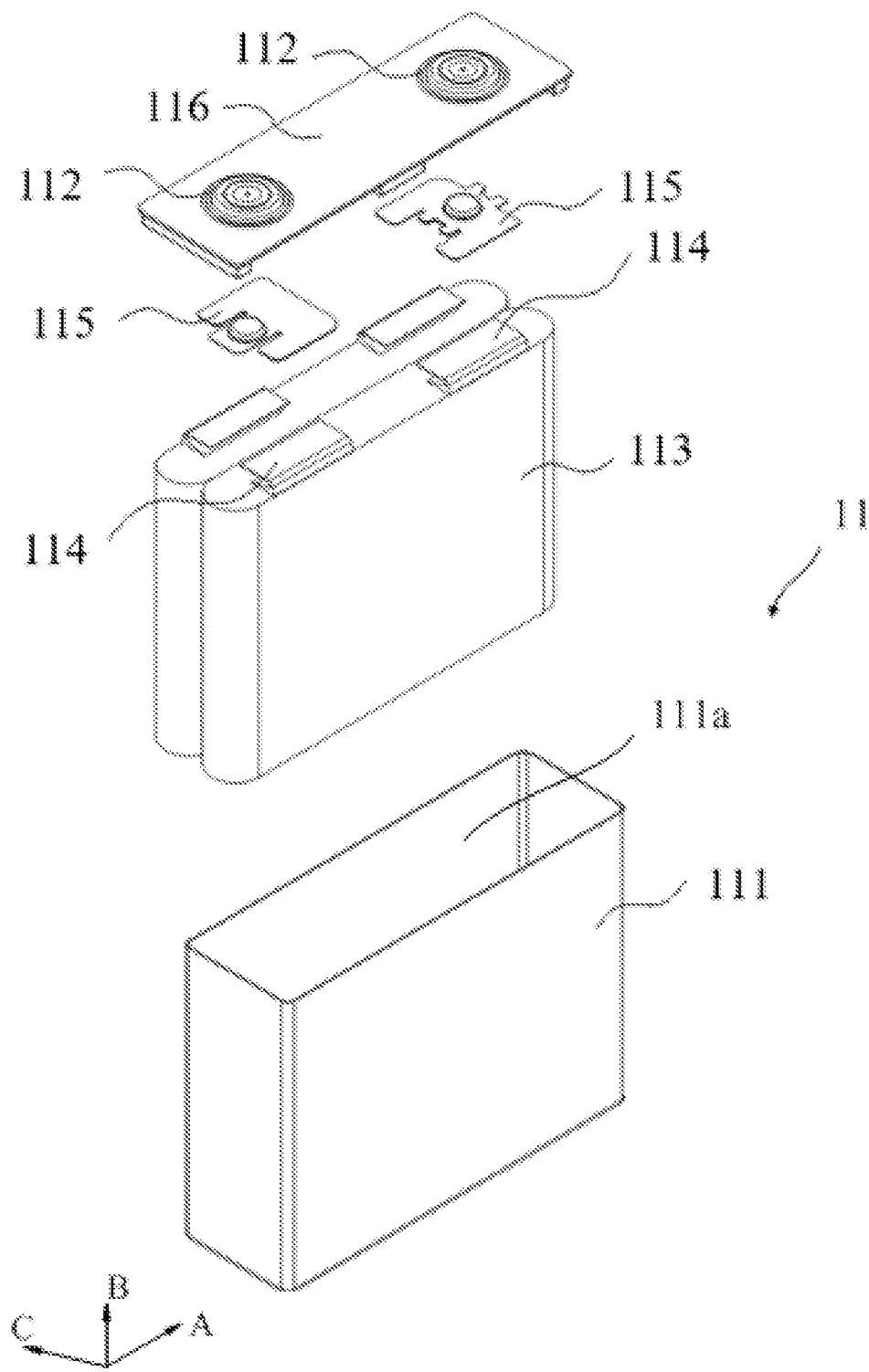
FIG. 2 is an exploded view of a structure of a battery cell in a battery pack according to an embodiment of this application.

As shown in FIG. 2, the battery cell 11 includes a battery housing 111 and an electrode assembly 113. The battery housing 111 may be made of a metal material such as aluminum, aluminum alloy, or nickel-plated steel. The battery housing 111 may be in a cuboid shape or another shape. In this embodiment, the battery housing 111 is in a cuboid shape. The battery housing 111 has an opening 111a. The electrode assembly 113 is accommodated in the battery housing 111. The opening 111a of the battery housing 111 is covered with a cover plate 116. Two electrode terminals 112 are disposed on the cover plate 116, and the two electrode terminals 112 are respectively a first electrode terminal and a second electrode terminal. The first electrode terminal is a positive electrode terminal, and the second electrode terminal is a negative electrode terminal. In other embodiments, alternatively, the first electrode terminal may be a negative electrode terminal, and the second electrode terminal is a positive electrode terminal. The cover plate 116 may be made of a metal material such as aluminum or aluminum alloy. A size of the cover plate 116 matches a size of the opening 111a of the battery housing 111. The electrode terminal 112 may be fixed on the cover plate 116 by welding, by using a rivet, or the like. A connecting piece 115 is disposed between the cover plate 116 and the electrode assembly 113. A tab 114 of the electrode assembly 113 is electrically connected to the electrode terminal 112 on the cover 116 by using the connecting piece 115. In this embodiment, there are two connecting pieces 115, which are respectively a positive connecting piece and a negative connecting piece.

In FIG. 2, two electrode assemblies 113 are disposed in the battery housing 111, and the two electrode assemblies 113 are stacked along a vertical direction (a direction to which an arrow C points). Certainly, in other embodiments, alternatively, one electrode assembly 113 may be disposed in the battery housing 111, or at least three electrode assemblies 113 are disposed in the battery housing 111. A plurality of electrode assemblies 113 are stacked along the vertical direction (the direction to which the arrow C points).

Figure 3A:
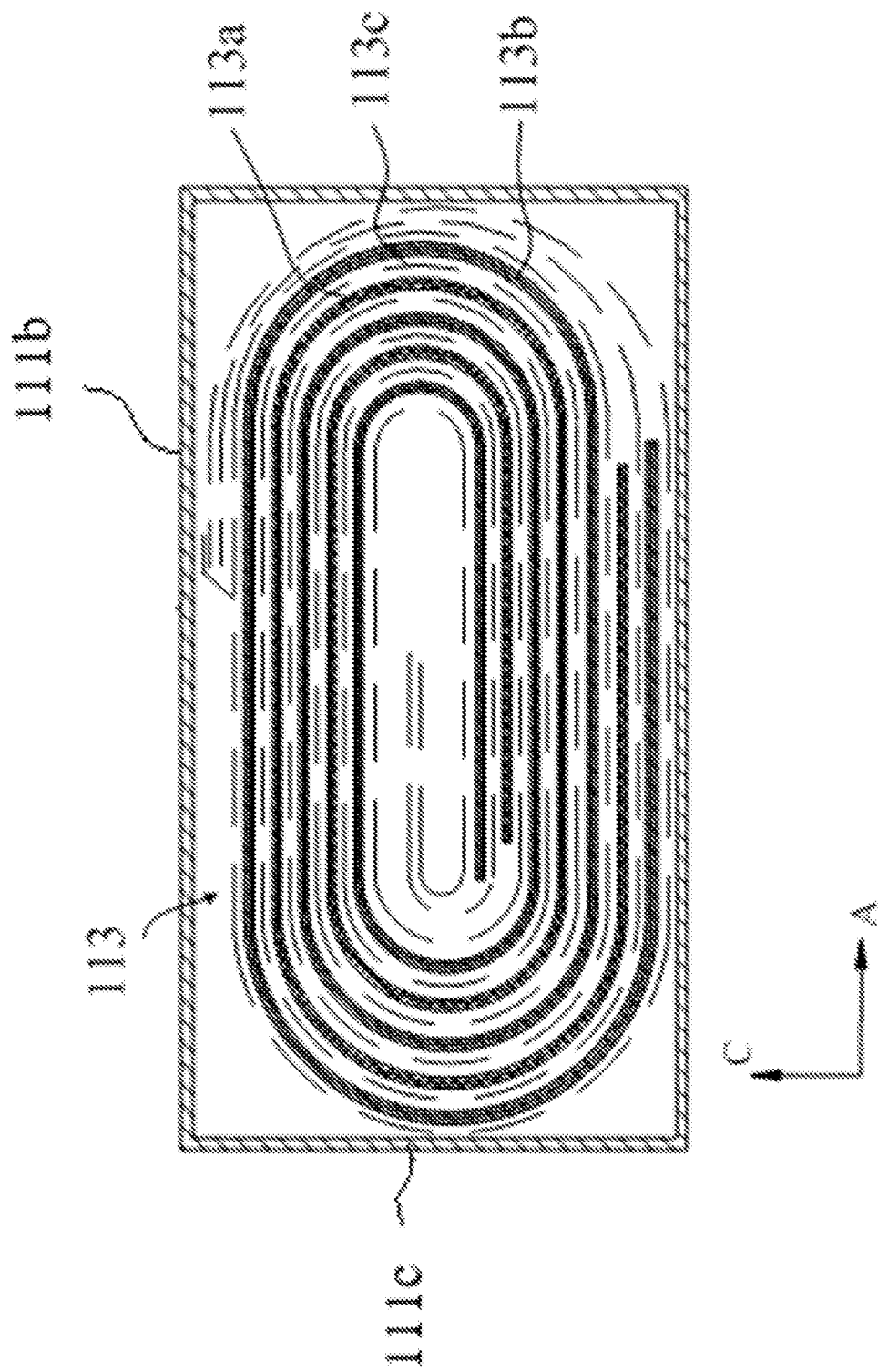
FIG. 3a is a sectional view of a structure of an electrode assembly of a winding structure in a battery cell.
Figure 3B:
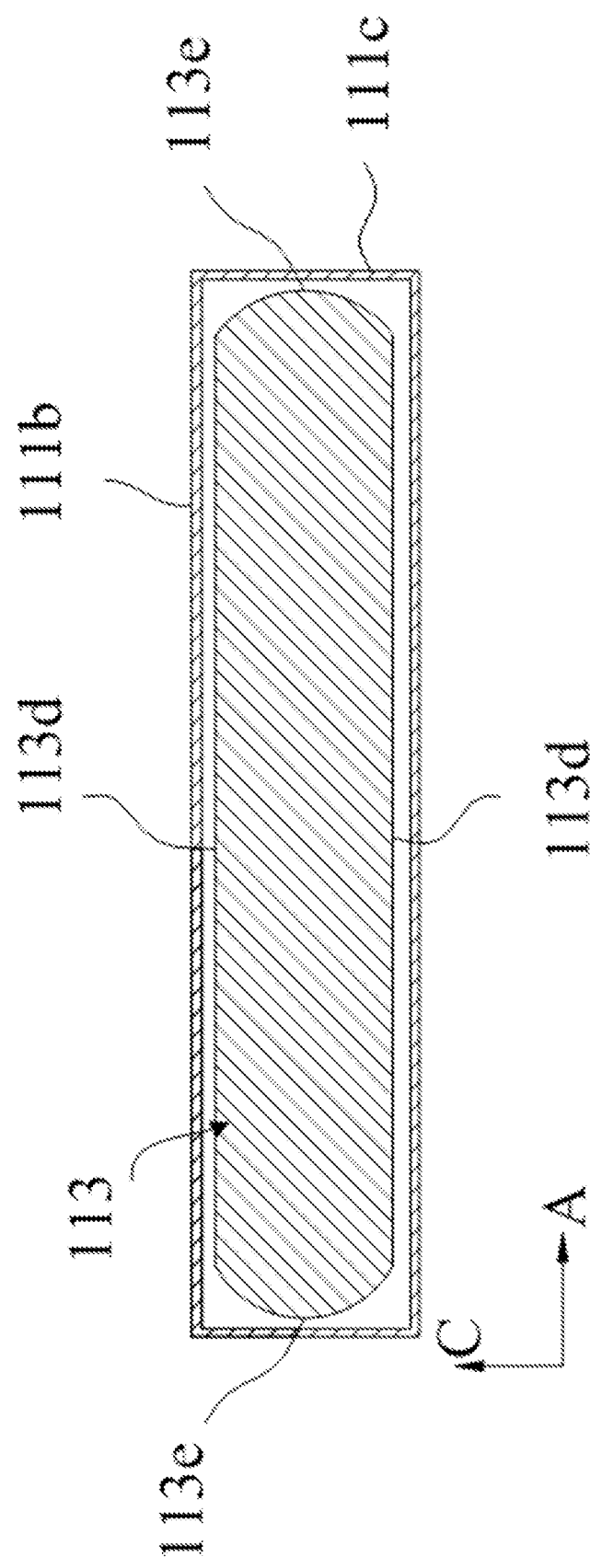
FIG. 3b is a schematic view of an outer contour of an electrode assembly of a winding structure in a battery cell.

As shown in FIG. 3a and FIG. 3b, the electrode assembly 113 includes a first electrode plate 113a, a second electrode plate 113b, and a separator 113c disposed between the first electrode plate 113a and the second electrode plate 113b. The first electrode plate 113a may be a positive electrode plate, and the second electrode plate 113b is a negative electrode plate. In other embodiments, alternatively, the first electrode plate 113a may be a negative electrode plate, and the second electrode plate 113b is a positive electrode plate. The separator 113c is an insulator located between the first electrode plate 113a and the second electrode plate 113b. A coating area of a positive electrode plate may be coated with an active substance of the positive electrode plate. A coating area of a negative electrode plate may be coated with an active substance of the negative electrode plate. A non-coating area that extends from the coating area of the positive electrode plate is used as a positive tab. A non-coating area that extends from the coating area of the negative electrode plate is used as a negative tab. The positive tab is electrically connected to a positive electrode terminal on the cover plate 116 by using a positive connecting piece. The negative tab is electrically connected to a negative electrode terminal on the cover plate 116 by using a negative connecting piece. As shown in FIG. 3a, in an implementation, the electrode assembly 113 is a winding structure. The first electrode plate 113a, the separator 113c, and the second electrode plate 113b are all strip-shaped structures. The first electrode plate 113a, the separator 113c, and the second electrode plate 113b are sequentially laminated, and wound at least twice to form the electrode assembly 113. The electrode assembly 113 is in a flat shape on the whole. In fabrication of the electrode assembly 113, the electrode assembly 113 may be first wound to form a hollow cylindrical structure. After the winding, the electrode assembly 113 is pressed and changed to a flat shape. FIG. 3b is a schematic view of an outer contour of the electrode assembly 113. An outer surface of the electrode assembly 113 includes two flat surfaces 113d, and the two flat surfaces 113d face each other along the vertical direction (the direction to which the arrow C points). The battery housing 111 is approximately in a cuboid shape. The flat surfaces 113d are approximately parallel to a largest outer surface of the battery housing 111. The flat surfaces 113d may be relatively flat surfaces. It is not required that the flat surfaces 113d should be completely flat surfaces. The two flat surfaces 113d are relative to narrow surfaces 113e on two sides of the electrode assembly 113, and an area of the flat surface 113d is greater than that of the narrow surface 113e of the electrode assembly 113.

Figure 4:
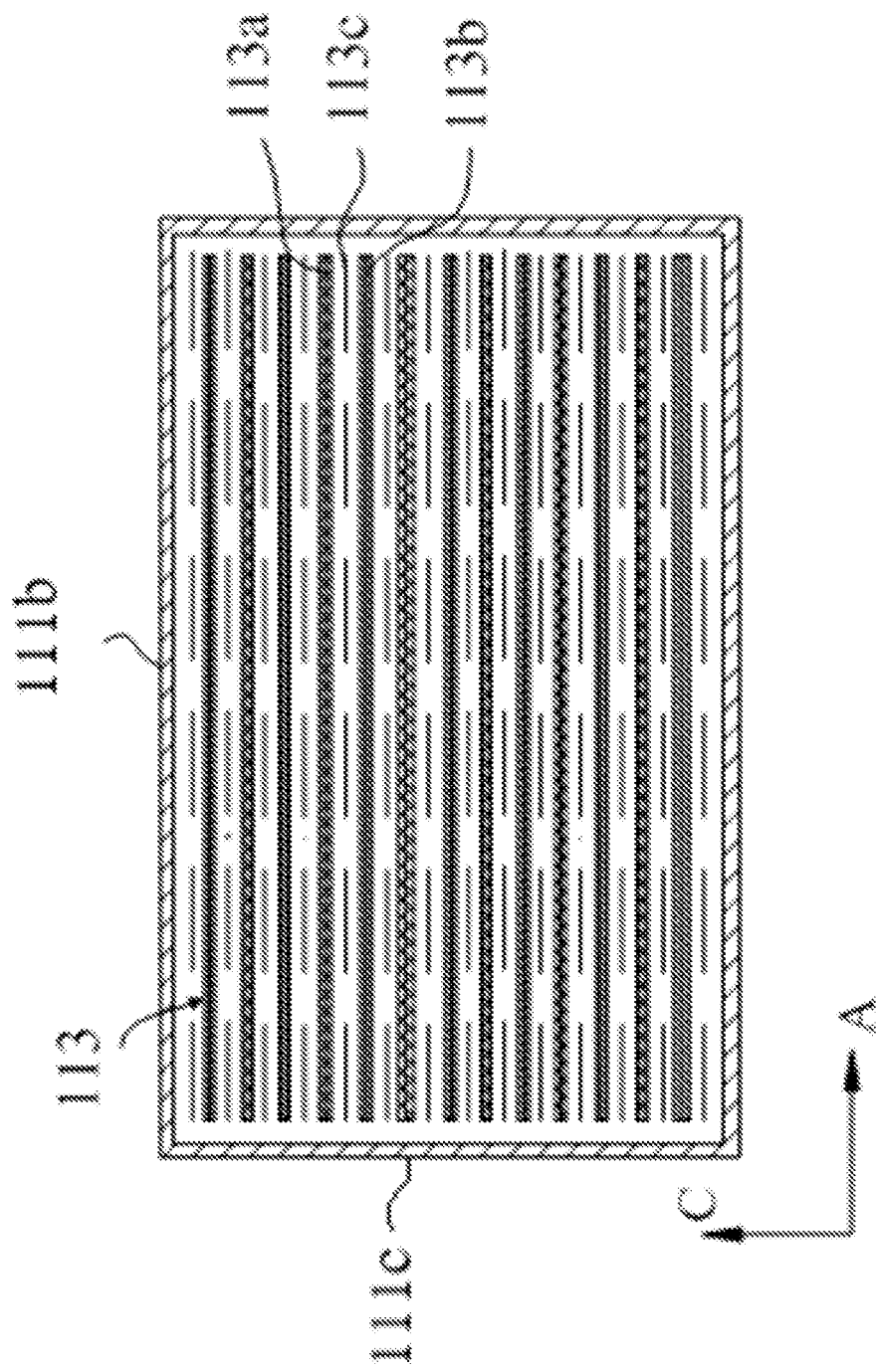
FIG. 4 is a schematic view of a structure of an electrode assembly of a laminated structure in a battery cell.

As shown in FIG. 4, in another implementation, alternatively, the electrode assembly 113 may be a laminated structure. To be specific, the electrode assembly 113 has a plurality of first electrode plates 113a and a plurality of second electrode plates 113b, and the separator 113c is disposed between the first electrode plate 113a and the second electrode plate 113b. The first electrode plate 113a, the separator 113c, and the second electrode plate 113b are sequentially laminated in disposition. The first electrode plate 113a, the separator 113c, and the second electrode plate 113b are laminated along the vertical direction (the direction to which the arrow C points).

Because the electrode assembly 113 inevitably swells along a thickness direction of an electrode plate in a charging/discharging process (in the electrode assembly 113 of the winding structure, there is greatest swelling force along a direction vertical to the flat surface 113d; in the electrode assembly 113 of the laminated structure, there is greatest swelling force along a stacking direction of the first electrode plate 113a and the second electrode plate 113b). Consequently, the battery housing 111 of the battery cell 11 swells in the vertical direction. In the battery module 1 provided by this embodiment of this application, a binding member 12 is disposed to limit the foregoing swelling deformation.

Figure 5:
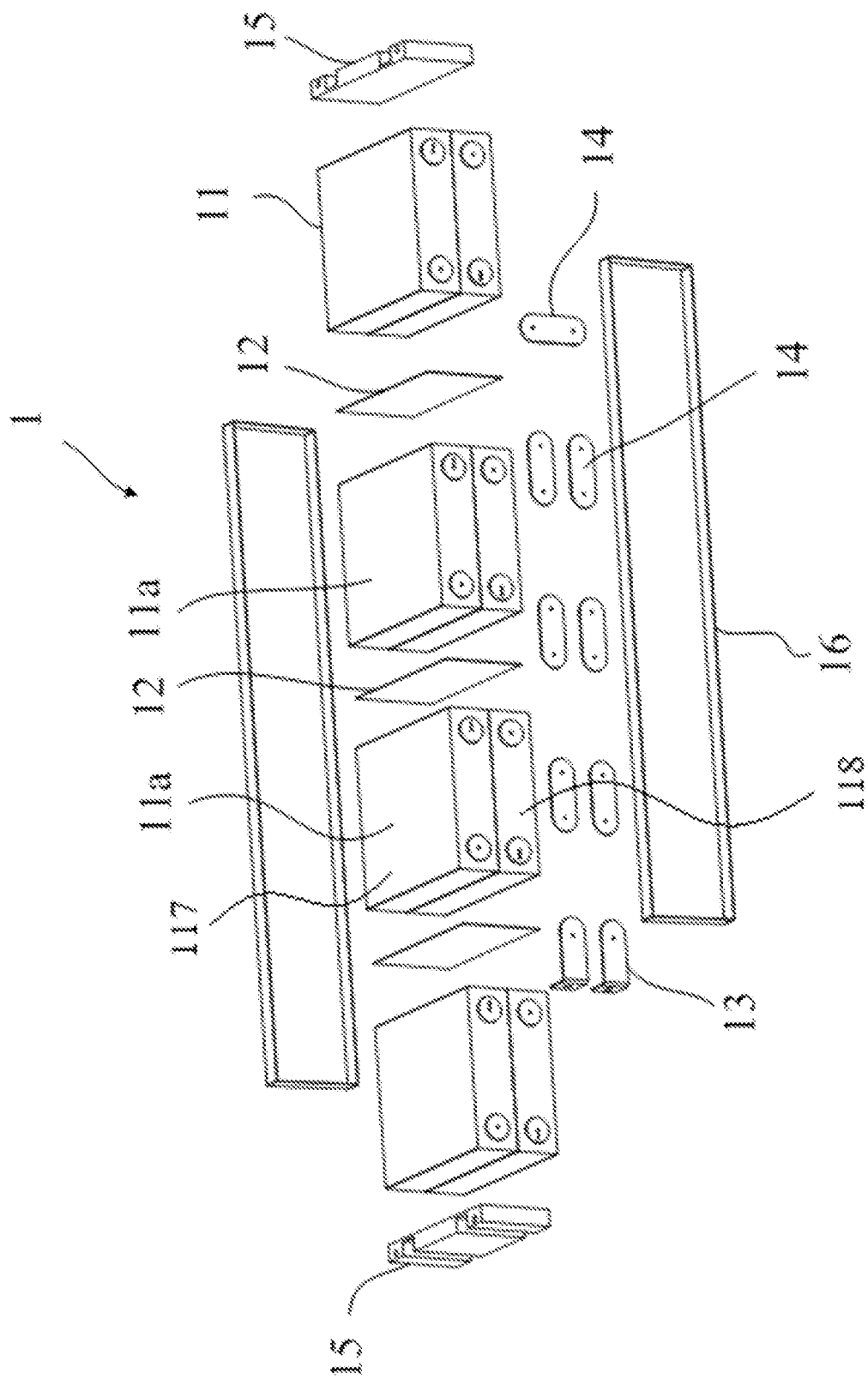
FIG. 5 is an exploded view of a battery module according to an embodiment of this application.
Figure 6:
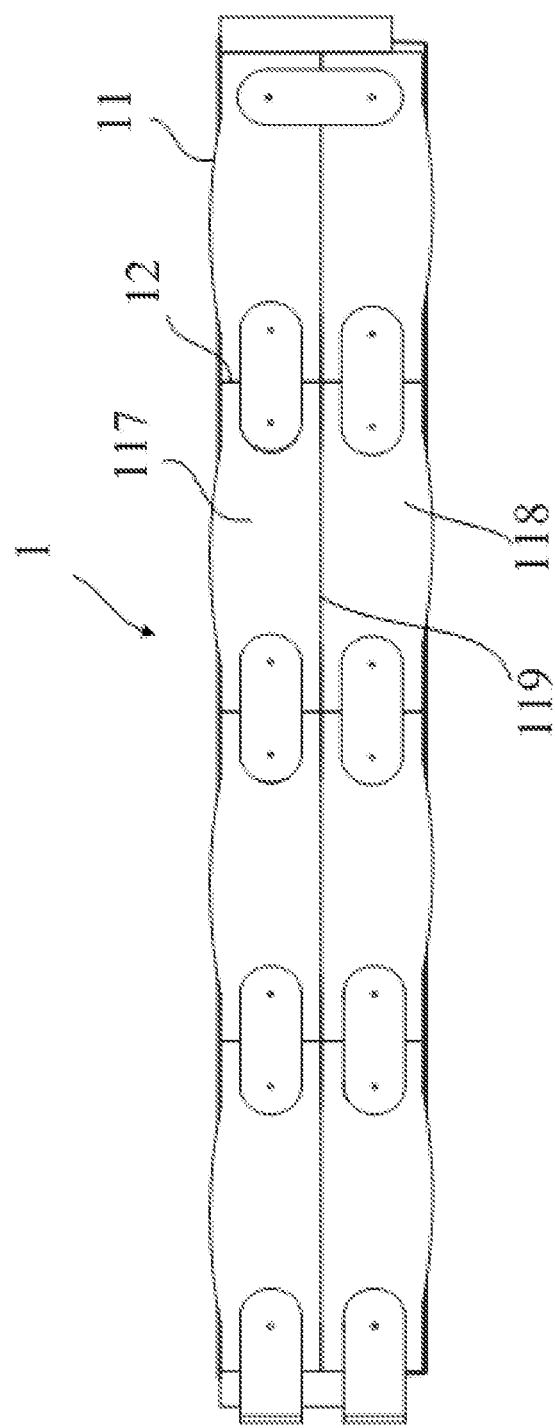
FIG. 6 is a schematic view of a structure of a battery module according to an embodiment of this application.

As shown in FIG. 5 and FIG. 6, a battery module 1 provided by an embodiment of this application includes a binding member 12 and a plurality of battery cell assemblies 11a that are arranged along a horizontal direction, where the battery cell assembly 11a includes an upper-layer battery cell 117 and a lower-layer battery cell 118 that are stacked along a vertical direction. In a battery cell assembly 11a, a battery cell 11 located on an upper side is an upper-layer battery cell 117, and a battery cell 11 located on a lower side is a lower-layer battery cell 118. Each battery cell 11 is connected in series or parallel by using a busbar 14, and then led out externally by using a leading-out terminal 13.

The upper-layer battery cell 117 and the lower-layer battery cell 118 are interconnected and form a joint 119. The binding member 12 extends along the vertical direction and covers the joint 119. The binding member 12 is located between two adjacent battery cell assemblies 11a, and the binding member 12 is fixed to the battery cell assemblies 11a.

When the battery cell 11 swells along the vertical direction, due to action of the binding member 12, the upper-layer battery cell 117 is limited by both the lower-layer battery cell 118 and the binding member 12, and the lower-layer battery cell 118 is limited by both the upper-layer battery cell 117 and the binding member 12. Therefore, no great swelling deformation of the battery cell 11 occurs at the joint 119. Referring to FIG. 6, no great swelling deformation of the upper-layer battery cell 117 or the lower-layer battery cell 118 occurs at the joint 119.

Figure 7:
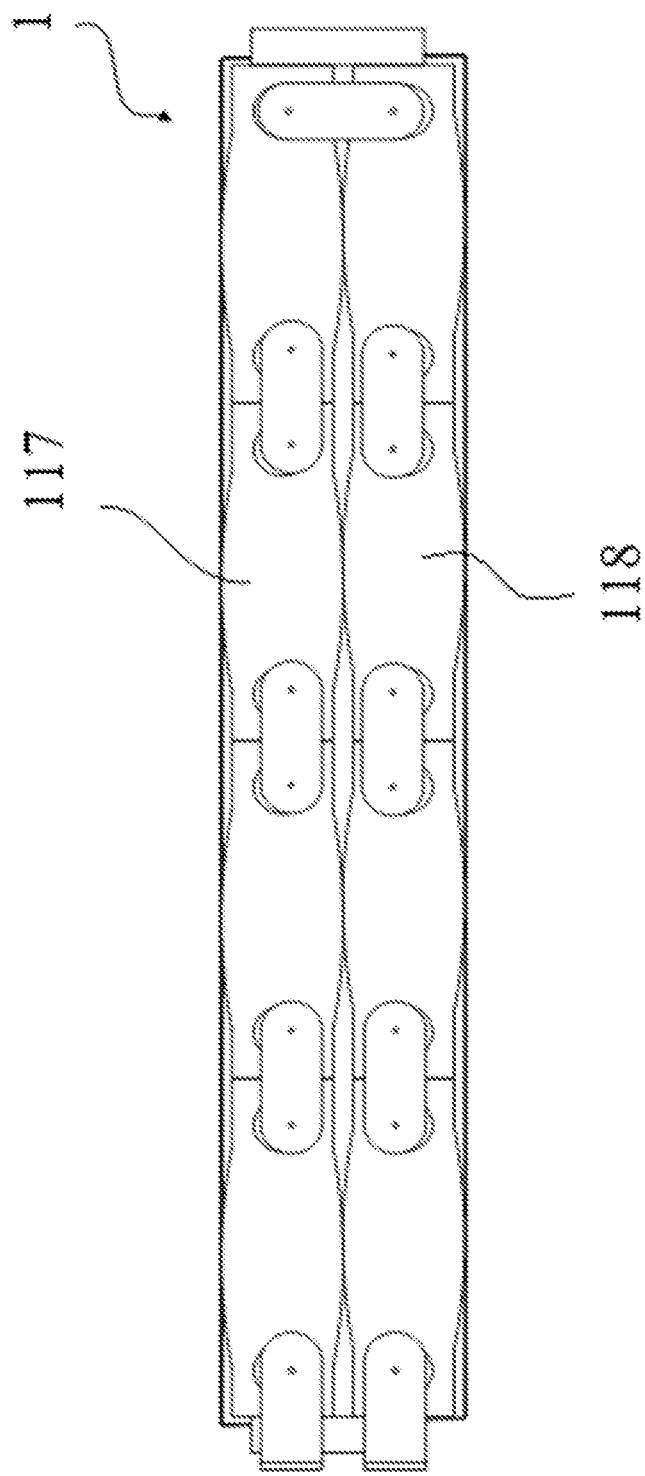
FIG. 7 is an effect comparison diagram of a battery module according to an embodiment of this application.

However, as shown in FIG. 7, it can be seen that if the binding member 12 is not disposed, severe swelling deformation occurs at the joint 119 between the upper-layer battery cell 117 and the lower-layer battery cell 118.

In some embodiments, as shown in FIG. 2 to FIG. 4, a battery housing 111 of the battery cell 11 is approximately a cuboid structure, and the battery housing 111 includes two first surfaces 111b and two second surfaces 111c. Two second surfaces 111c in each battery cell 11 face each other along the horizontal direction (for example, a length direction to which an arrow A points). Two first surfaces 111b in each battery cell 11 face each other along the vertical direction (a direction to which an arrow C points). There may be a transition of a right angle between the first surface 111b and the second surface 111c. Likewise, alternatively, there may be a transition of a circular arc curved surface or a curved surface with a plurality of bendings between the first surface 111b and the second surface 111c. In some embodiments, an area of the first surface 111b is greater than an area of the second surface 111c.

Because the battery cell 11 generates gas in the battery housing 111 in a charging/discharging process, the generated gas applies force to the battery housing 111 and causes the battery housing 111 to swell externally more severely. Because the area of the first surface 111b is greater than the area of the second surface 111c in this embodiment, and the two first surfaces 111b in the battery cell 11 face each other along the vertical direction, a direction of greatest force applied by the generated gas to the battery housing 111 is also the vertical direction. Therefore, swelling force of the battery module 1 along the horizontal direction is further reduced.

In some embodiments, one of the second surfaces 111c of the upper-layer battery cell 117 and one of the second surfaces 111c of the lower-layer battery cell 118 are respectively bonded and fixed to one side of the binding member 12 by using an adhesive. Therefore, the upper-layer battery cell 117 and the lower-layer battery cell 118 are simultaneously fixed and bound by using one binding member 12.

In some embodiments, two sides of the binding member 12 are respectively fixed to the two adjacent battery cell assemblies 11a. The adhesive may be a structural adhesive, and the binding member 12 is fixedly connected to the battery cell assemblies 11a by using the structural adhesive. Because the structural adhesive is disposed to implement fixing, there is a greater restraint to swelling deformation of the battery cell 11. This further ensures an effect of preventing swelling deformation.

In some embodiments, the two sides of the binding member 12 are respectively fixed to the two adjacent battery cell assemblies 11a. Therefore, restraints to the battery cells 11 on two sides can be balanced, and the force for preventing swelling deformation is more even.

In this application, one battery cell assembly 11a includes two layers of battery cells 11. In other embodiments, one battery cell assembly 11a may also include three or more layers of battery cells 11. When there are three or more layers of battery cells 11, the binding member 12 may be an integrated part for covering and fixing the plurality of battery cells 11, or may be a plurality of separate structures, where the plurality of separate structures cover the joint 119 between two adjacent layers of battery cells 11. The binding member 12 may cover only the joint 119. In some embodiments, the binding member 12 completely covers two opposite surfaces in the battery cell assembly 11a. To be specific, the binding member 12 completely covers one of the second surfaces 111c of the upper-layer battery cell 117 and one of the second surfaces 111c of the lower-layer battery cell 118. When the binding member 12 completely covers the sides of the upper-layer battery cell 117 and the lower-layer battery cell 118, because a contact area between the binding member 12 and the battery cell 11 is greater, the binding member 12 has greater force to resist tearing, and the effect of preventing swelling deformation is better. The binding member 12 may be a metal plate, provided that its thickness satisfies preset strength, that is, in the charging/discharging process of the battery module 1, swelling force of the battery cell 11 does not break the metal plate. In some embodiments, the binding member 12 is an aluminum plate. This can further ensure light weight of the battery module 1 while satisfying a strength requirement.

In this embodiment, to match a shape and structure of the battery cell 11, the binding member 12 is a rectangular plate. Therefore, when the battery module 1 is loaded in an accommodating cavity between a lower case 2 and an upper cover 3, the binding member 12 does not interfere with the lower case 2 and the upper cover 3.

Further, to prevent swelling of the battery module 1 in the horizontal direction, the battery module 1 provided in this embodiment further includes a pair of end plates 15, which are respectively fixed at two ends of the horizontal direction of a plurality of battery cells 11. The end plates 15 are respectively bonded and fixed to battery cell assemblies 11a located at the two ends of the horizontal direction. This further limits swelling of the battery module 1 in the horizontal direction. A strap 16 wraps the end plates 15 from the outside to fix the end plates 15 to the battery module 1.

An electric apparatus provided by an embodiment of this application includes one or more of the battery module 1.

The foregoing descriptions are only preferred embodiments of this application, and not intended to limit this application. For a person skilled in the art, this application may be subject to various changes and variations. Any modifications, equivalent replacements, improvements, and the like made within the spirit and principle of this application shall fall within the protection scope of this application.

What is claimed is:

1. A battery module, comprising a binding member and a plurality of a battery cell assembly that are arranged along a horizontal direction, wherein the battery cell assembly comprises an upper-layer battery cell and a lower-layer battery cell that are stacked along a vertical direction; wherein:
   the upper-layer battery cell and the lower-layer battery cell are interconnected and form a joint; and
   the binding member covers the joint, the binding member is located between two adjacent battery cell assemblies, the binding member is fixed to the battery cell assemblies through an adhesive, wherein the binding member is fixed to at least a portion of a side surface of the upper battery cell and a portion of a side surface of the lower battery cell, and the binding member is configured to limit the lower-layer battery cell and the upper-layer battery cell from swelling deformation at the joint.

2. The battery module according to claim 1, wherein each of the upper-layer battery cell and the lower-layer battery cell comprises an electrode assembly and a battery housing, the electrode assembly is accommodated in the battery housing, and the electrode assembly comprises a first electrode plate, a second electrode plate, and a separator disposed between the first electrode plate and the second electrode plate; and
   the electrode assembly is a winding structure in a flat shape, wherein an outer surface of the electrode assembly comprises two flat surfaces, and the two flat surfaces face each other along the vertical direction; or the electrode assembly is a laminated structure, wherein the first electrode plate, the separator, and the second electrode plate are laminated along the vertical direction.

3. The battery module according to claim 2, wherein the battery housing comprises two first surfaces and two second surfaces, and an area of each first surface is greater than an area of each second surface; and
   the two second surfaces face each other along the horizontal direction, and the two first surfaces face each other along the vertical direction.

4. The battery module according to claim 3, wherein one of the second surfaces of the upper-layer battery cell and a corresponding one of the second surfaces of the lower-layer battery cell are respectively bonded and fixed to one side of the binding member by using the adhesive.

5. The battery module according to claim 4, wherein two sides of the binding member are respectively fixed to the two adjacent battery cell assemblies.

6. The battery module according to claim 4, wherein the adhesive is a structural adhesive.

7. The battery module according to claim 4, wherein the binding member completely covers one of the second surfaces of the upper-layer battery cell and a corresponding one of the second surfaces of the lower-layer battery cell.

8. The battery module according to claim 1, wherein the binding member is a metal plate.

9. The battery module according to claim 1, wherein the battery module further comprises a pair of end plates, and the two end plates are respectively bonded and fixed to battery cell assemblies located at two ends of the horizontal direction.

10. The battery module according to claim 1, wherein the binding member is fixed to upper-layer battery cell at a first side surface of the upper-layer battery in the vertical direction, wherein the binding member covers only a portion of the first side surface; and the binding member is fixed to lower-layer battery cell at a second side surface of the lower-layer battery in the vertical direction, wherein the binding member covers only a portion of the second side surface.

11. A battery pack, comprising:
a lower case and an upper cover, wherein the lower case and the upper cover are interconnected and form an accommodating cavity; and
a battery module accommodated in the accommodating cavity, wherein the battery module further comprises: a binding member and a plurality of battery cell assemblies that are arranged along a horizontal direction, wherein the battery cell assembly comprises an upper-layer battery cell and a lower-layer battery cell that are stacked along a vertical direction, wherein:
the upper-layer battery cell and the lower-layer battery cell are interconnected and form a joint; and
the binding member covers the joint, the binding member is located between two adjacent battery cell assemblies, the binding member is fixed to the battery cell assemblies through an adhesive, wherein the binding member is fixed to at least a portion of a side surface of the upper battery cell and a portion of a side surface of the lower battery cell, and the binding member is configured to limit the lower-layer battery cell and the upper-layer battery cell from swelling deformation at the joint.

12. The battery pack according to claim 11, wherein each of the upper-layer battery cell and the lower-layer battery cell comprises an electrode assembly and a battery housing, the electrode assembly is accommodated in the battery housing, and the electrode assembly comprises a first electrode plate, a second electrode plate, and a separator disposed between the first electrode plate and the second electrode plate; and
the electrode assembly is a winding structure in a flat shape, wherein an outer surface of the electrode assembly comprises two flat surfaces, and the two flat surfaces face each other along the vertical direction; or the electrode assembly is a laminated structure, wherein the first electrode plate, the separator, and the second electrode plate are laminated along the vertical direction.

13. The battery pack according to claim 12, wherein the battery housing comprises two first surfaces and two second surfaces, and an area of each first surface is greater than an area of each second surface; and the two second surfaces face each other along the horizontal direction, and the two first surfaces face each other along the vertical direction.

14. The battery pack according to claim 13, wherein one of the second surfaces of the upper-layer battery cell and a corresponding one of the second surfaces of the lower-layer battery cell are respectively bonded and fixed to one side of the binding member by using the adhesive.

15. The battery pack according to claim 14, wherein two sides of the binding member are respectively fixed to the two adjacent battery cell assemblies.

16. The battery pack according to claim 14, wherein the adhesive is a structural adhesive.

17. The battery pack according to claim 14, wherein the binding member completely covers one of the second surfaces of the upper-layer battery cell and a corresponding one of the second surfaces of the lower-layer battery cell.

18. The battery pack according to claim 11, wherein the binding member is a metal plate.

19. The battery pack according to claim 11, wherein the battery module further comprises a pair of end plates, and the two end plates are respectively bonded and fixed to battery cell assemblies located at two ends of the horizontal direction.

20. An electric apparatus, comprising a battery module, the battery module comprising a binding member and a plurality of battery cell assemblies that are arranged along a horizontal direction, wherein each battery cell assembly comprises an upper-layer battery cell and a lower-layer battery cell that are stacked along a vertical direction, wherein:
the upper-layer battery cell and the lower-layer battery cell are interconnected and form a joint;
the binding member covers the joint, the binding member is located between two adjacent battery cell assemblies, and the binding member is fixed to the battery cell assemblies through an adhesive; and
wherein the binding member is fixed to at least a portion of a side surface of the upper battery cell and a portion of a side surface of the lower battery cell, and the binding member is configured to limit the lower-layer battery cell and the upper-layer battery cell from swelling deformation at the joint.

* * * * *